US012566857B1

(12) United States Patent
Chiarenza et al.

(10) Patent No.: US 12,566,857 B1
(45) Date of Patent: Mar. 3, 2026

(54) SYSTEMS AND METHODS TO MONITOR VERACITY OF PROFILES OF THIRD-PARTY, ONLINE PLATFORMS

(71) Applicant: NOTCOMMON CORP., Austin, TX (US)

(72) Inventors: Giulio Chiarenza, Austin, TX (US); Michael Robert Pierce, Austin, TX (US); Andrew Busey, Austin, TX (US)

(73) Assignee: NOTCOMMON CORP., Austin, TX (US)

( * ) Notice: Subject to any disclaimer, the term of this patent is extended or adjusted under 35 U.S.C. 154(b) by 0 days.

(21) Appl. No.: 18/821,924

(22) Filed: Aug. 30, 2024

(51) Int. Cl.
$G06F 21/57$ (2013.01)
$H04L 67/306$ (2022.01)

(52) U.S. Cl.
CPC ............ G06F 21/57 (2013.01); H04L 67/306 (2013.01)

(58) Field of Classification Search
CPC ................................ G06F 21/57; H04L 67/306
See application file for complete search history.

(56) References Cited

U.S. PATENT DOCUMENTS

| | | | | |
|---|---|---|---|---|
| 11,803,634 | B2 * | 10/2023 | Hack | G06F 9/4401 |
| 11,997,141 | B2 * | 5/2024 | Schutt | H04L 63/04 |
| 12,363,156 | B1 * | 7/2025 | Thompson | H04L 63/1433 |
| 2010/0274815 | A1 | 10/2010 | Vanasco | |
| 2013/0124644 | A1 | 5/2013 | Hunt | |

| | | | | |
|---|---|---|---|---|
| 2017/0076405 | A1 | 3/2017 | Shah | |
| 2017/0078136 | A1 | 3/2017 | Byttow | |
| 2022/0321568 | A1 * | 10/2022 | Shivanna | G06Q 30/018 |
| 2023/0125755 | A1 * | 4/2023 | Karri | G06F 11/3457 714/46 |
| 2024/0275802 | A1 * | 8/2024 | Azvine | H04L 63/1441 |
| 2024/0297871 | A1 * | 9/2024 | Thankappan | H04L 63/166 |
| 2024/0370945 | A1 | 11/2024 | Pierce | |

(Continued)

OTHER PUBLICATIONS

Greg Sides, Dara Fontein. How to Get Verified on Facebook: A Step by Step Guide. Oct. 27, 2021. (Retrieved at: https:// blog.hootsuite. com/how-to-get-verified-on-facebook/) (Year: 2021) (14 pages).

*Primary Examiner* — Stephen T Gundry
(74) *Attorney, Agent, or Firm* — Esplin & Associates, PC

(57) ABSTRACT

Systems and methods to monitor veracity of profiles of a third-party, online platforms. Exemplary implementations may: store veracity information pertaining to profiles within third-party platforms; monitor the third-party platforms to detect profiles created within the third-party; identify collections of profiles that correspond with the detected profiles; obtained profile information for the detected profiles and the individual profiles of the corresponding collections of profiles; compare profile information for the detected profiles with profile information for the individual profiles of the corresponding collections of profiles; determine, based on the comparison, sets of values of veracity parameters for the detected profiles; determine whether the detected profiles are associated with the individual entities; responsive to the determination of the detected profiles being associated with the individual entities, update the veracity information; responsive to the determination of the detected profiles not being associated with the individual entities, generate and transmit indications to the entities.

20 Claims, 4 Drawing Sheets

(56) References Cited

U.S. PATENT DOCUMENTS

| | | | |
|---|---|---|---|
| 2024/0394409 A1* | 11/2024 | Rogers | G06F 21/6245 |
| 2024/0427896 A1* | 12/2024 | Shroff | G06F 21/575 |
| 2025/0103304 A1* | 3/2025 | Ye | G06F 8/33 |
| 2025/0265343 A1* | 8/2025 | Shroff | G06F 9/44505 |

* cited by examiner

100

Server(s) 102

Electronic Storage 128

Processor(s) 130

Machine-Readable Instructions 106

Detection Component 108

Profile Information Component 110

Veracity Component 112

Indication Component 114

116

Client Computing Platform(s) 104

External Resources 126

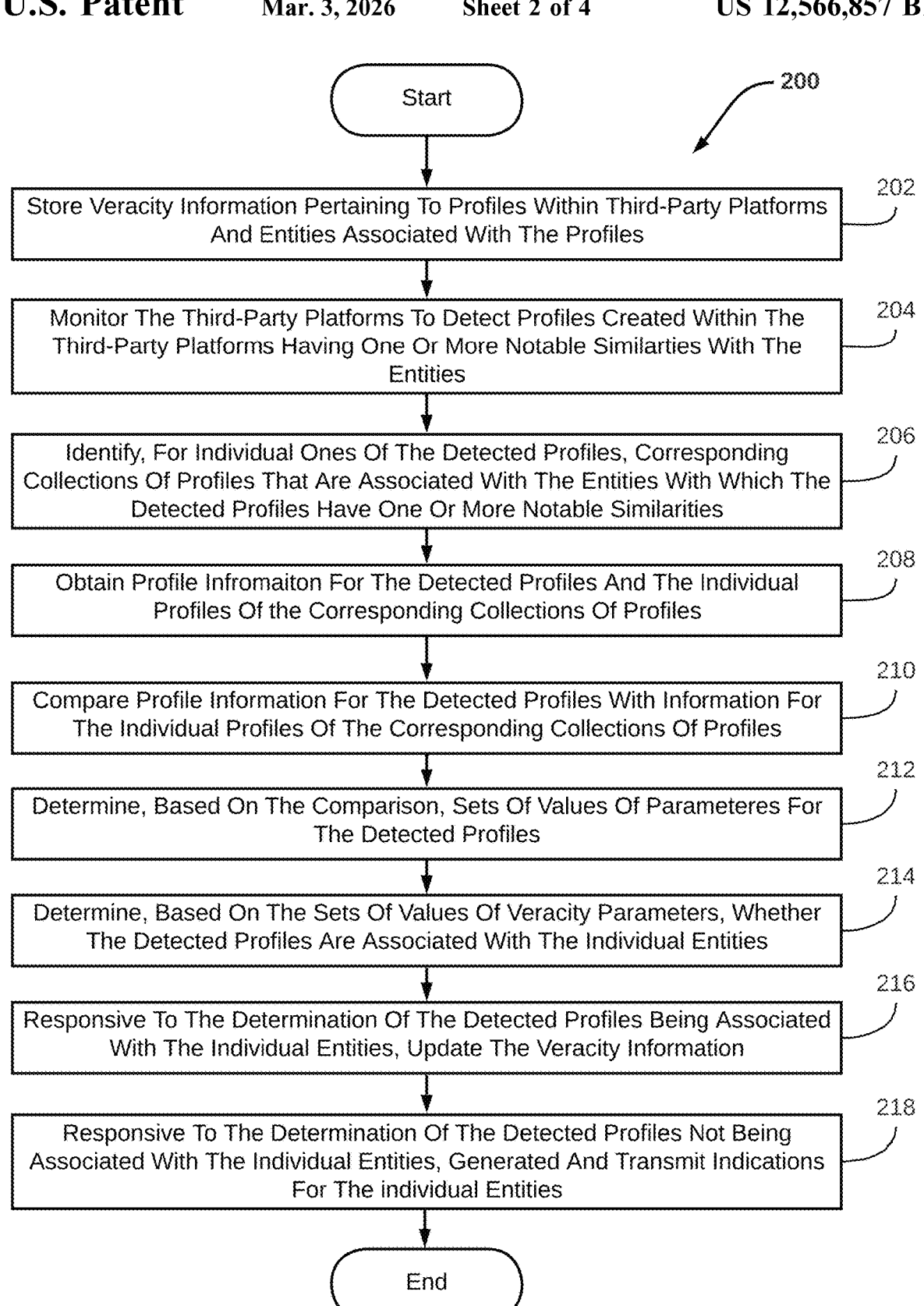

Start

200

202
Store Veracity Information Pertaining To Profiles Within Third-Party Platforms And Entities Associated With The Profiles 204
Monitor The Third-Party Platforms To Detect Profiles Created Within The Third-Party Platforms Having One Or More Notable Similarties With The Entities 206
Identify, For Individual Ones Of The Detected Profiles, Corresponding Collections Of Profiles That Are Associated With The Entities With Which The Detected Profiles Have One Or More Notable Similarities 208
Obtain Profile Infromaiton For The Detected Profiles And The Individual Profiles Of the Corresponding Collections Of Profiles 210
Compare Profile Information For The Detected Profiles With Information For The Individual Profiles Of The Corresponding Collections Of Profiles 212
Determine, Based On The Comparison, Sets Of Values Of Parameteres For The Detected Profiles 214
Determine, Based On The Sets Of Values Of Veracity Parameters, Whether The Detected Profiles Are Associated With The Individual Entities 216
Responsive To The Determination Of The Detected Profiles Being Associated With The Individual Entities, Update The Veracity Information 218
Responsive To The Determination Of The Detected Profiles Not Being Associated With The Individual Entities, Generated And Transmit Indications For The individual Entities End

FIG. 2

SYSTEMS AND METHODS TO MONITOR VERACITY OF PROFILES OF THIRD-PARTY, ONLINE PLATFORMS

FIELD OF THE DISCLOSURE

The field of the present disclosure is electronic information security, and more particularly relates to veracity monitoring of profiles across multiple third-party, online platforms.

BACKGROUND

Online platforms that utilize and/or provide access to user profiles are known. Fraudulent profiles (e.g., phishing, human engineering, extracting payment or other information, diverting attention from the user, etc.) may be hosted on the online platforms due to opportunistic and/or dishonest behavior by users. These fraudulent profiles pose significant dangers to other users, including the risk of identity theft, financial loss, privacy breaches, etc.

SUMMARY

One aspect of the present disclosure relates to monitoring veracity of profiles of third-party, online platforms. In some implementations, automatically monitoring veracity of collections of profiles may limit risks associated with collections of profiles, regardless of the size of the collections. By way of non-limiting example, monitoring veracity of collections of profiles may limit exposure of online traffic to duped profiles. For example, monitoring veracity of an individual collection of profiles may enable detection of susceptibility to and/or presence of duped profiles in an online profile. In some implementations, monitoring veracity of collections of profiles may enable more efficient management and/or organization of profiles associated with entities and/or referenced within profiles associated with the entities.

A system configured to monitor veracity of profiles of third-party, online platforms may include non-transitory electronic storage, one or more hardware processors configured by machine-readable instructions, and/or other components. Executing the machine-readable instructions may cause the one or more hardware processors to facilitate monitoring veracity of profiles of third-party, online platforms. The machine-readable instructions may include one or more computer program components. The one or more computer program components may include a detection component, a profile information component, a veracity component, an indication component, and/or other components.

The non-transitory electronic storage may be configured to store veracity information and/or other information. Veracity information may pertain to profiles within third-party platforms, entities associated with the profiles, and/or include other information. The profiles may be associated with the entities in a many to one manner. By way of non-limiting illustration, collections of profiles may correspond to different ones of the entities. The profiles may include a first collection of profiles that correspond to a first entity. The first collection of profiles may include a first profile, a second profile, and/or other profiles. The veracity information may include values of veracity parameters that characterize likelihood of the individual profiles being associated with the individual entities. By way of. non-limiting illustration, the veracity information may include a first set of parameter values for the veracity parameters that characterize likelihood of the first profile being associated with the first entity, a second set of parameter values for the veracity parameters that characterize likelihood of the second profile being associated with the first entity, and/or other sets of parameter values for the veracity parameters.

The detection component may be configured to monitor the third-party platforms to detect profiles created within the third-party platforms having one or more notable similarities with the entities. Notable similarities may include resemblances in attributes, characteristics, content, and/or other aspects. By way of non-limiting illustration, a third profile having one or more notable similarities with the first entity may be detected.

The detection component may be configured to identify, for individual ones of the detected profiles having one or more notable similarities with the entities, corresponding collections of profiles that are associated with the entities with which the detected profiles have one or more notable similarities. By way of non-limiting illustration, the first collection of profiles corresponding with the first entity may be identified.

The profile information component may be configured to obtain profile information for the detected profiles, the individual profiles of the corresponding collections of profiles, and/or other profiles. The profile information may be obtained from the third-party platforms. The profile information for individual profiles may include information presented within the individual profiles within the third-party platforms, profile activity of the individual profiles, and/or other information. By way of non-limiting illustration, first profile information for the first profile, second profile information for the second profile, and third profile information for the third profile may be obtained from the third-party platforms.

The profile information component may be configured to compare profile information for the detected profiles with profile information for the individual profiles of the corresponding collections of profiles. Aspects of profile information for the detected profiles may be compared with similar aspects of profile information for the individual profiles of the corresponding collections of profiles. By way of non-limiting illustration, individual aspects of the first profile information and second profile information may be compared with similar individual aspects of the third profile information.

The veracity component may be configured to determine, based on the comparison, sets of values of veracity parameters for the detected profiles. Individual veracity parameters may characterize consistency between individual aspects of profile information for the detected profile and profile information for the individual profiles of the corresponding collections of profiles. The sets of values of veracity parameters may indicate a likelihood of the detected profiles being associated with the individual entities associated with the individual profiles of the corresponding collection of profiles. By way of non-limiting illustration, a third set of values of veracity parameters for the third profile may be determined.

The veracity component may be configured to determine, based on the sets of values of veracity parameters, whether the detected profiles are associated with the individual entities. By way of non-limiting illustration, a first determination may be made of the third profile being associated with the first entity based on the third set of values of veracity parameters.

The veracity component may be configured to, responsive to the determination of the detected profiles being associated with the individual entities, update the veracity information for the individual entities to include the sets of veracity parameters, the detected profiles, and/or other information. Updating the veracity information may include modifying the collections of profiles associated with the individual entities to include the detected profiles. By way of non-limiting illustration, veracity information for the first entity may be updated to include the third set of values of veracity parameters responsive to the first determination. Updating the first veracity information may include modifying the first collection of profiles to include the third profile.

The indication component may be configured to, responsive to the determination of the detected profiles not being associated with the individual entities, generate indications for the individual entities associated with the individual profiles of the corresponding collections of profiles and transmitting the indications to the individual entities.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a method to monitor veracity of profiles of third-party, online platforms, in accordance with one or more implementations.

DETAILED DESCRIPTION

Figure 1:
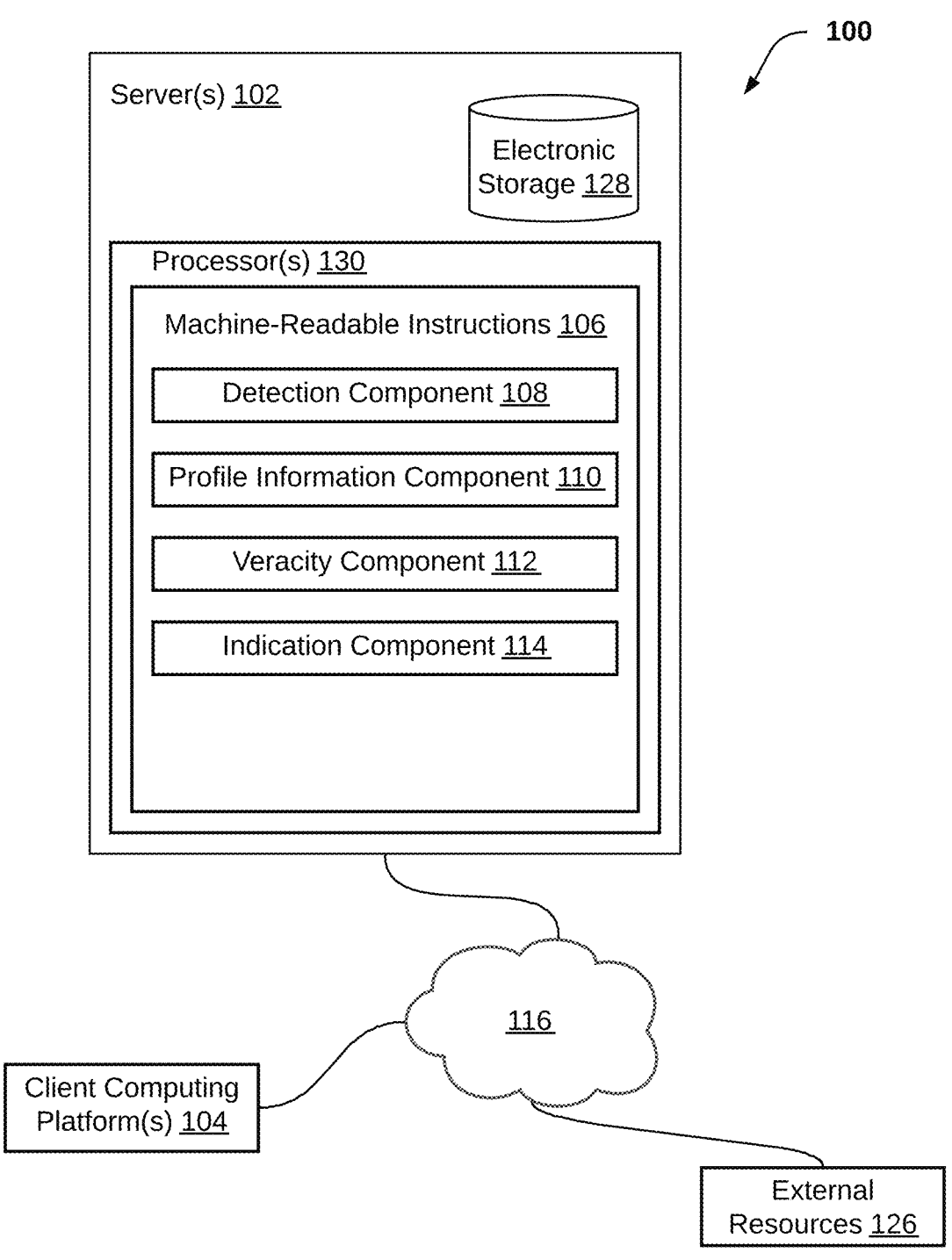
FIG. 1 illustrates a system configured to monitor veracity of profiles of third-party, online platforms, in accordance with one or more implementations.

FIG. 1 illustrates a system 100 configured to monitor veracity of profiles of third-party, online platforms, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Electronic storage 128 may be configured to store veracity information and/or other information. Veracity information may pertain to profiles within third-party platforms, entities associated with the profiles, and/or include other information. Individual entities may be one or more people, a brand, a company, a team, a non-profit organization, another type of organization, and/or another collection of people. The term "associated" may indicate a profile is created, owned, or operated by an entity. The profiles may be associated with the entities in a many to one manner. By way of non-limiting illustration, collections of profiles may correspond to different ones of the entities. The profiles may include a first collection of profiles that correspond to a first entity. The first collection of profiles may include a first profile, a second profile, and/or other profiles. The first profile may be hosted on a first third-party platform and the second profile may be hosted on a second third-party platform, separate and distinct from the first third-party platform. The first profile and the second profile may be created, owned, and/or operated by the first entity.

The veracity information may include values of veracity parameters for individual profiles that characterize likelihood of the individual profiles being associated with the individual entities. By way of non-limiting illustration, the veracity information may include a first set of parameter values for the veracity parameters that characterize likelihood of the first profile being associated with the first entity, a second set of parameter values for the veracity parameters that characterize likelihood of the second profile being associated with the first entity, and/or other sets of parameter values for the veracity parameters. The individual values of veracity parameters may correspond with individual aspects of the individual profiles and/or the consistency of the individual aspects with other ones of profiles within the collection of profiles associated with the individual entities. Values of veracity parameters may be numeric, textual, ordinal, categorical, and/or other forms. Individual ones of the veracity parameters may characterize consistency of individual profile aspects. Individual profile aspects may include profile age, profile URL, username, profile and/or display name, avatar or profile picture, biography, location, platform verification (e.g., Facebook verified, YouTube verified, etc.), profile and/or account activity, and/or other profile aspects. For example, values of a first veracity parameter may pertain to profile and/or account activity. Values of the first veracity parameter may be numeric (e.g., a score from one to ten), categorical (e.g., low moderate, high), and/or other forms. The value of the first veracity parameter for the first profile may characterize the profile account activity. By way of non-limiting illustration, a 'low' value for the first veracity parameter may indicate the profile and/or account activity is consistent with profile and/or account activity of other profiles within the first collection of profiles. The 'low' value for the first veracity parameter may indicate the profile and/or account activity is inconsistent with fraudulent and/or suspicious activity. For example, fraudulent and/or suspicious activity may include excessive posting, following, unfollowing, tagging other profiles, commenting, direct messaging, and/or other types of account activity.

Server(s) 102 may be configured by machine-readable instructions 106. Machine-readable instructions 106 may include one or more instruction components. The instruction components may include computer program components. The instruction components may include one or more of detection component 108, profile information component 110, veracity component 112, indication component 114, and/or other instruction components.

Detection component 108 may be configured to monitor the third-party platforms to detect profiles created within the third-party platforms having one or more notable similarities with the entities and/or other profiles associated with the entities. The profiles may be newly created profiles. Notable similarities may include similarities in attributes, characteristics, content, and/or other aspects of the detected profiles and one or more other entities and/or profiles associated with the entities. By way of non-limiting illustration, a third profile having one or more notable similarities with the first entity may be detected. The third profile may have a username that is the same as or similar to a username of the first profile. The third profile may have a profile name that is the same as or similar to the name of the first entity. In some implementations, the username and/or profile name may be considered to match if the percentage of characters that are the same and/or similar meets or exceeds a threshold. For example, the threshold may be 70%, 75%, 80%, 85%, 90%, and/or other thresholds. In some implementations, the newly created profiles may be detected responsive to one or more particular similarities with the entities and/or other profiles associated with the entities. In some implementations, the requisite similarity for detection may be the same or similar username. The requisite similarity may be the same or similar username and profile picture.

In some implementations, monitoring the third-party platforms may include transmitting, in an ongoing manner and at predetermined intervals of time, requests for profile information to the third-party platforms and receiving, responsive to the requests, the profile information from the third-party platforms. Monitoring the third-party platforms may further include analyzing the received profile information to identify (i) newly created profiles and (ii) individual entities with which the newly created profiles have one or more notable similarities. The newly created profiles may include profiles created within the most recent interval of time. In some implementations, monitoring the third-party platforms may include receiving profile information from a real-time information stream from the third-party platforms and analyzing the profile information to identify (i) newly created profiles and (ii) individual entities with which the newly created profiles have one or more notable similarities.

Detection component 108 may be configured to identify, for individual ones of the detected profiles having one or more notable similarities with the entities and/or profiles associated with the entities, corresponding collections of profiles that are associated with the entities with which the detected profiles have one or more notable similarities. By way of non-limiting illustration, responsive to the detected profile having one or more notable similarities with an entity, a collection of profiles associated with the entity may be identified. Responsive to the detected profile having one or more notable similarities with another profile, one or more collections of profiles to which the other profile belongs may be identified.

Profile information component 110 may be configured to obtained profile information for the detected profiles, the individual profiles of the corresponding collections of profiles, and/or other information. The profile information may be obtained from the third-party platforms (e.g., via an API key) and/or other external resource(s) 126. The profile information for individual profiles may include information characterizing different aspects of the individual profiles. The profile information may include information presented within the individual profiles within the third-party platforms, profile activity of the individual profiles, and/or other information. Information presented within the individual profiles may be visible to viewers of the individual profiles. By way of non-limiting illustration, information presented within the individual profiles may include username, profile and/or display name, profile picture, cover picture and/or background photo, location, biography, links to other profiles, job title, company and/or organization, list of friends and/or followers, list of profiles following, verification status (e.g., third-party platform verification, system verification), badges, and/or other information. Profile activity of the individual profiles may include creating posts, sharing and/or reposting content, liking and/or otherwise reacting to content, commenting, tagging and/or being tagged in content, sending and/or receiving messages, inclusion in groups and/or discussion forums, livestreaming, following and/or unfollowing profiles, changing profile information, profile and/or account age, associations with one or more other profiles, and/or other types of activity. Profile information for the individual profiles may be obtained from the third-party platform in which the individual profiles are hosted. By way of non-limiting illustration, first profile information for the first profile may be obtained from the first third-party platform. Second profile information for the second profile may be obtained from the second third-party platform. Third profile information for the third profile may be obtained from the third-party platform.

Profile information component 110 may be configured to compare profile information for the detected profiles with profile information for the individual profiles of the corresponding collections of profiles. Aspects of profile information for the detected profiles may be compared with similar aspects of profile information for the individual profiles of the corresponding collections of profiles. By way of non-limiting illustration, the username of the first profile and the username of the second profile may be compared with the username of the third profile. The profile biographies of the first profile and the second profile may be compared to the profile biography of the third profile. In some implementations, comparing profile information of the detected profile to profile information of profiles of the corresponding collection of profiles may indicate the detected profile has similarities but may be attempting to impersonate the entity associated with the corresponding collection of profiles. For example, the username of the first profile and the second profile may be "joesmith" and the username of the third profile may be "jo3sm1th." The combination of similarities and/or differences may indicate the third profile is fraudulent and/or attempting to impersonate the first entity associated with the first profile and the second profile. In other words, the third profile may be associated with an entity that is not the first entity.

Veracity component 112 may be configured to determine, based on the comparison, sets of values of veracity parameters for the detected profiles. Individual veracity parameters may characterize consistency between individual aspects of profile information for the detected profile and profile information for the individual profiles of the corresponding collections of profiles. In some implementations, veracity component 112 may be configured to provide the profile information of the detected profile, the profile information of the profiles of the corresponding collection of profiles, and/or other information as input to one or more machine-learning models. The one or more machine-learning models may be configured to generate outputs including sets of values of veracity parameters and/or veracity scored based on inputs to the models. In some implementations, the generated output(s) may indicate whether the detected profile is associated with the entity associated with the profiles of the corresponding collection of profiles. In some implementations, the one or more models may be stored in electronic storage and/or included in external resource(s) 126 (and obtained via network(s) 116).

The sets of values of veracity parameters may indicate a likelihood of the detected profiles being associated with the individual entities associated with the individual profiles of the corresponding collection of profiles. In some implementations, individual values of veracity parameters may characterize consistency of individual aspects of profile information between the detected profile and the profiles of the corresponding collection of profiles. By way of non-limiting illustration, a third set of values of veracity parameters for the third profile may be determined. The third set of values of veracity parameters may include a first value for a first veracity parameter. The first veracity parameter may characterize consistency of profile biography between the third profile and the first profile and the second profile. the first value of the first veracity parameter for the third profile may indicate the third profile has low consistency of profile biography with the first profile and the second profile. In other words, the profile biography may be sufficiently different and/or may suggest the third profile is attempting to impersonate the first entity associated with the first profile and the second profile.

Veracity component 112 may be configured to determine, based on the sets of values of veracity parameters, whether the detected profiles are associated with the individual entities. In some implementations, veracity component 112 may be configured to generate veracity scores for the detected profiles based on the sets of values of veracity parameters for the detected profiles. The veracity scores for the detected profiles may indicate a level of consistency with the individual profiles of the corresponding collections of profiles. In some implementations, the veracity scores for the detected profiles may indicate a likelihood of the detected profiles being fraudulent profiles. The veracity scores may be generated by aggregating, averaging, and/or otherwise processing the sets of values of veracity parameters. By way of non-limiting illustration, a first veracity score for the third profile may be generated based on the third set of values of veracity parameters. The first veracity score may be generated by averaging the values of the third set of values of veracity parameters. In some implementations, particular values of veracity parameters may be given more weight (i.e., have more impact on the determination or generation) than other values of veracity parameters for determining whether the detected profiles are associated with the individual entities and/or for generating the veracity scores. By way of non-limiting illustration, consistency of username may have higher significance compared to other profile aspects and therefore may be weighted more heavily.

Veracity component 112 may be configured to determine whether the veracity scores for the detected profiles meet veracity criteria. Meeting veracity criteria may indicate the detected profiles are associated with the individual entities. Responsive to the determination of the veracity scores meeting veracity criteria, veracity component 112 may be configured to update the veracity information for the individual entities to include the sets of veracity parameters and the detected profiles. By way of non-limiting illustration, a first determination may be made of the third profile being associated with the first entity based on the third set of values of veracity parameters and/or the first veracity score meeting or exceeding a threshold.

In some implementations, veracity component 112 may utilize one or more machine-learning models to determine whether the detected profiles are associated with the individual entities. The machine-learning models may be configured to generate outputs indicating whether the detected profiles are associated with individual entities based on inputs to the model. The inputs to the model may include profile information for the detected profiles, profile information for profiles of the corresponding collections of profiles, sets of values of veracity parameters, and/or other information.

Veracity component 112 may be configured to, responsive to the determination of the detected profiles being associated with the individual entities, update the veracity information for the individual entities to include the sets of veracity parameters, the detected profiles, and/or other information. Updating the veracity information may include modifying the collections of profiles associated with the individual entities to include the detected profiles. By way of non-limiting illustration, veracity information for the first entity may be updated to include the third set of values of veracity parameters responsive to the first determination. Updating the first veracity information may include modifying the first collection of profiles to include the third profile.

Indication component 114 may be configured to, responsive to the determination of the detected profiles not being associated with the individual entities, generate indications for the individual entities associated with the individual profiles of the corresponding collections of profiles and transmitting the indications to the individual entities. In some implementations, indication component 114 may be configured to generate a first indication for the first entity, responsive to a determination of the third profile not being associated with the first entity. The first indication may denote the determined inconsistency between the third profiles and one or more profiles of the first collection of profiles (i.e., the first profile and the second profile). By way of non-limiting illustration, the first indication may indicate a low level of security of the first collection of profiles and/or the first entity. The low level of security may denote the third profile is a fraudulent profile and/or attempting to impersonate the first entity. In other words, the content of the third profile may appear to viewers of the third profile to be associated with the first entity and/or profiles of the first collection of profiles. In some implementations, the first indication may indicate a suggestion that the first entity take action to increase security of the first collection of profiles. By way of non-limiting illustration, the first indication may include a suggestion to report the third profile to the third-party platform in which the third profile is created. The first indication may include a link through which the first entity may report and/or instructions detailing reporting procedures for the third-party platform.

In some implementations, the first indication may include an inquiry for the first entity to confirm that the third profile is not associated and/or not owned by the first entity. By way of non-limiting illustration, the first indication may be provided via a user interface of a client computing platform associated with the first entity and include one or more user selectable interface elements. Responsive to the first entity indicating, through user selection, that the third profile is associated with the first entity, veracity information may be updated. Updating veracity information for the first entity may include adding the third profile to the first collection of profiles associated with the first entity.

In some implementations, the first indication may be in accordance with the third set of parameter values and/or the third veracity score. For example, the first indication may be a badge, symbol, icon, and/or other graphic displayed within the third-party platform in which the third profile was created. The graphic being displayed may be determined by the third set of parameter values, the thirds veracity score, and/or other information. By way of non-limiting illustration, a first symbol may be displayed responsive to the third veracity score being within a first range of scores, a second symbol may be displayed responsive to the third veracity score being within a second range of scores, and so on and so forth. The first range of scores may be separate and distinct from the second range of scores.

In some implementations, veracity component 112 may be configured to determine one or more labels for the detected profiles based on the sets of parameter values. The labels may indicate a level of confidence for account authenticity for the corresponding detected accounts. By way of non-limiting illustration, the labels may include low, moderate, high, and/or other labels. A 'low' label may indicate it is highly unlikely that the account is authentic and/or associated with the corresponding entity. A 'low' label may indicate that the profile is likely a fraudulent profile. A 'high' label may indicate it is highly likely that the account is authentic and/or associated with the corresponding entity. A 'high' label may indicate that the profile is unlikely a fraudulent account. In some implementations, the badges, symbols, icons, and/or other graphics displayed within the third-party platforms and/or within a user interface of client computing platform may be determined by the labels for the detected profiles. By way of non-limiting illustration, a 'low' label may correspond with a red icon, stop sign symbol, and/or other graphics. A 'moderate' label may correspond with a yellow icon, a caution symbol, and/or other graphics. A 'high' label may correspond with a green icon, a checkmark, and/or other graphics. It will be appreciated that this is not intended to be limiting, different labels may correspond to different levels of authenticity and/or security.

Indication component 114 may be configured to transmit the one or more individual indications to the individual entities. In some implementations, an individual indication may be transmitted to an individual entity through a push notification, an instant message, an email, a phone call, and/or other forms of communication with the individual entity. In some implementations, an individual notification may be transmitted to individual entity via presentation on one or more computing platforms. The presentation on the one or more computing platforms may be in the form of an icon, an image, a badge, text, and/or another form. By way of non-limiting example, an individual indication may be presented on one or more client computing platforms as a badge on a webpage. By way of non-limiting example, the first indication may be transmitted to the first entity. In some implementations, the indication may be transmitted to individual users and/or entities responsive to the individual users and/or entities view and/or interacting with the profiles. By way of non-limiting illustration, an indication may be transmitted to a second entity, responsive to the second entity receiving a message from the third profile and/or viewing the third profile. In some implementations, the one or more indications may be presented and/or displayed within a browser extension interface and/or other interfaces. The browser extension interface may facilitate searches for one or more entities and/or collections of profiles associated with the one or more entities.

Figure 3A:
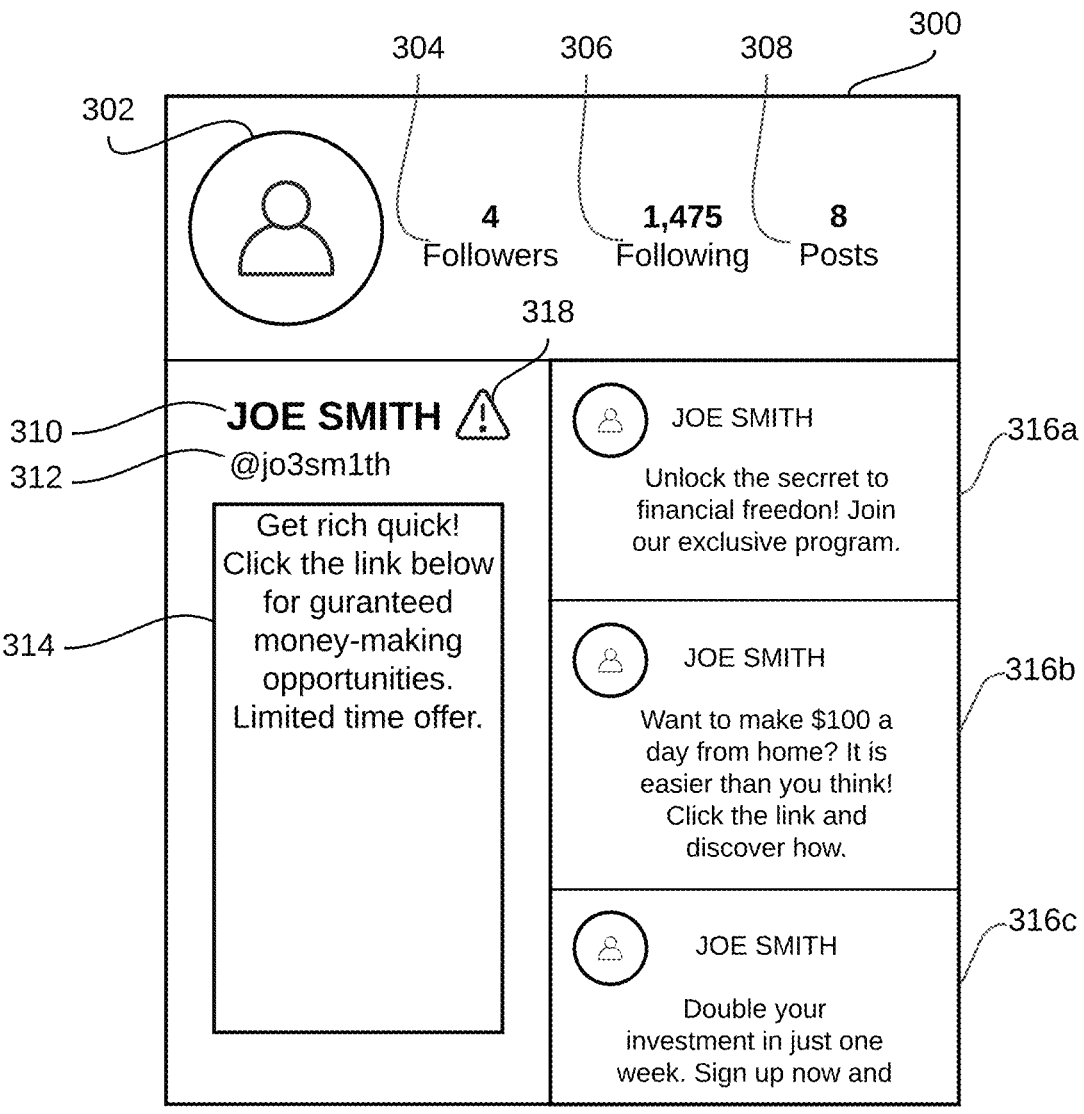
FIGS. 3A-B illustrates an exemplary profile on a social media platform associated with an individual user.
Figure 3B:
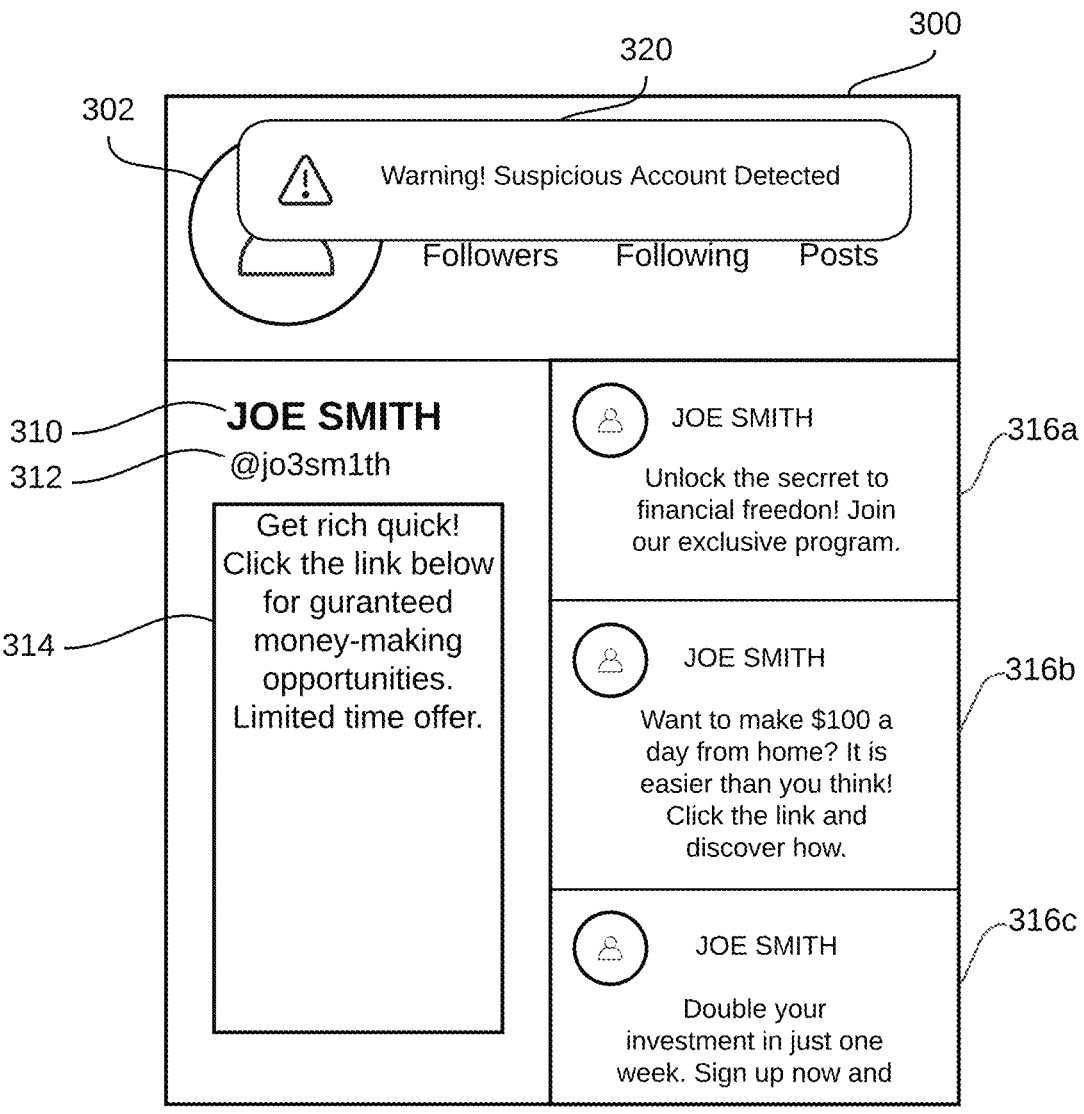

FIGS. 3A-B illustrates an exemplary profile 300 on a social media platform associated with an individual user. Profile 300 may include one or more profile aspects including profile picture 302, follower count 304, following count 308, post count 308, display and/or profile name 310, username 312, profile biography 314, one or more posts 316a-c, and/or other profile aspects. Profile information for profile 300 may characterize the profile aspects included in profile 300. In some implementations, profile 300 may detected for having one or more notable similarities to another profile and/or an entity. The detection may be made by a component that is the same as or similar to detection component 108. A corresponding collection of profiles may be identified for profile 300 based on the other profile and/or the entity with which profile 300 has one or more notable similarities. The identification may be made by a component that is the same as or similar to detection component 108. Profile information may be obtained for profile 300 and the individual profiles of the corresponding collection of profiles. Profile information may be obtained by a component that is the same as or similar to profile information component 110. The profile information for profile 300 and profile information for the individual profiles of the corresponding collection of profile may be compared to determine a set of values of veracity parameters for profile 300. The determination may be made by a component that is the same as or similar to veracity component 112. A determination may be made, based on the set of values of veracity parameters for profile 300, whether profile 300 is associated with the entity. The determination may be made by a component that is the same as or similar to veracity component 112. Responsive to a determination that profile 300 is not associated with the entity, profile 300 may be displayed with symbol 318.

Symbol 318 may denote profile 112 is a fraudulent profile and/or attempting to impersonate another entity. In some implementations, as shown in FIG. 3B, a notification 320 may be displayed responsive to a determination that profile 300 is not associated with the entity. Symbol 318 and/or notification 320 may be transmitted by a component that is the same as or similar to indication component 114. Symbol 318 and/or notification 320 may be transmitted to the entity and/or viewers of profile 300.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

FIG. 2 illustrates method 200 for monitoring veracity of profiles of third-party, online platforms, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing veracity information and/or other information. Veracity information may pertain to profiles within third-party platforms, entities associated with the profiles, and/or include other information. The profiles may be associated with the entities in a many to one manner. By way of non-limiting illustration, collections of profiles may correspond to different ones of the entities. The profiles may include a first collection of profiles that correspond to a first entity. The first collection of profiles may include a first profile, a second profile, and/or other profiles. The veracity information may include values of veracity parameters that characterize likelihood of the individual profiles being associated with the individual entities. By way of. non-limiting illustration, the veracity information may include a first set of parameter values for the veracity parameters that characterize likelihood of the first profile being associated with the first entity, a second set of parameter values for the veracity parameters that characterize likelihood of the second profile being associated with the first entity, and/or other sets of parameter values for the veracity parameters. Operation 202 may be performed by one or more components including a component that is the same as or similar to electronic storage 128, in accordance with one or more implementations.

An operation 204 may include monitoring the third-party platforms to detected profiles created within the third-party platforms having one or more notable similarities with the entities. Notable similarities may include resemblances in attributes, characteristics, content, and/or other aspects. By way of non-limiting illustration, a third profile having one or more notable similarities with the first entity may be detected. Operation 204 may be performed by one or more hardware processors configured by machine-readable instructions including a component that is the same as or similar to profile detection component 108, in accordance with one or more implementations.

An operation 206 may include identifying, for individual ones of the detected profiles having one or more notable similarities with the entities, collections of profiles that correspond with the entities with which the detected profiles have one or more notable similarities. By way of non-limiting illustration, the first collection of profiles corresponding with the first entity may be identified. Operation 206 may be performed by one or more hardware processors configured by machine-readable instructions including a component that is the same as or similar to detection component 108, in accordance with one or more implementations.

An operation 208 may include obtaining profile information for the detected profiles, the individual profiles of the corresponding collections of profiles, and/or other profiles. The profile information may be obtained from the third-party platforms. The profile information for individual profiles may include information presented within the individual profiles within the third-party platforms, profile activity of the individual profiles, and/or other information. By way of non-limiting illustration, first profile information for the first profile, second profile information for the second profile, and third profile information for the third profile may be obtained from the third-party platforms. Operation 208 may be performed by one or more hardware processors configured by machine-readable instructions including a component that is the same as or similar to profile information component 110, in accordance with one or more implementations.

An operation 210 may include comparing profile information for the detected profiles with profile information for the individual profiles of the corresponding collections of profiles. Aspects of profile information for the detected profiles may be compared with similar aspects of profile information for the individual profiles of the corresponding collections of profiles. By way of non-limiting illustration, individual aspects of the first profile information and second profile information may be compared with similar individual aspects of the third profile information. Operation 210 may be performed by one or more hardware processors configured by machine-readable instructions including a component that is the same as or similar to profile information component 110.

An operation 212 may include determining, based on the comparison, sets of values of veracity parameters for the detected profiles. Individual veracity parameters may characterize consistency between individual aspects of profile information for the detected profile and profile information for the individual profiles of the corresponding collections of profiles. The sets of values of veracity parameters may indicate a likelihood of the detected profiles being associated with the individual entities associated with the individual profiles of the corresponding collection of profiles. By way of non-limiting illustration, a third set of values of veracity parameters for the third profile may be determined. Operation 212 may be performed by one or more hardware processors configured by machine-readable instructions including a component that is the same as or similar to veracity component 112.

An operation 214 may include determining, based on the sets of values of veracity parameters, whether the detected profiles are associated with the individual entities. By way of non-limiting illustration, a first determination may be made of the third profile being associated with the first entity based on the third set of values of veracity parameters. Operation 214 may be performed by one or more hardware processors configured by machine-readable instructions including a component that is the same as or similar to veracity component 112.

An operation 216 may include, responsive to the determination of the detected profiles being associated with the individual entities, updating the veracity information for the individual entities to include the sets of veracity parameters, the detected profiles, and/or other information. Updating the veracity information may include modifying the collections of profiles associated with the individual entities to include the detected profiles. By way of non-limiting illustration, veracity information for the first entity may be updated to include the third set of values of veracity parameters responsive to the first determination. Updating the first veracity information may include modifying the first collection of profiles to include the third profile. Operation 216 may be performed by one or more hardware processors configured by machine-readable instructions including a component that is the same as or similar to veracity component 112.

An operation 218 may include, responsive to the determination of the detected profiles not being associated with the individual entities, generate indications for the individual entities associated with the individual profiles of the corresponding collections of profiles and transmitting the indications to the individual entities. Operation 218 may be performed by one or more hardware processors configured by machine-readable instructions including a component that is the same as or similar to indication component 114.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to monitor veracity of profiles of third-party, online platforms, the system comprising:

non-transitory electronic storage media configured to store veracity information that pertains to profiles within third-party platforms and entities associated with the profiles, wherein the profiles are associated with the entities in a many to one manner such that collections of profiles correspond to different ones of the entities, the profiles including a first collection of profiles that correspond to a first entity, the first collection of profiles including a first profile and a second profile, wherein the veracity information includes values of veracity parameters that characterize likelihood of the individual profiles being associated with the individual entities such that the veracity information includes a first set of parameter values for the veracity parameters that characterize likelihood of the first profile being associated with the first entity, and a second set of parameter values for the veracity parameters that characterize likelihood of the second profile being associated with the first entity;

one or more physical processors configured by machine-readable instructions to:

monitor the third-party platforms to detect profiles created within the third-party platforms having one or more notable similarities with the entities, wherein notable similarities include resemblances in attributes, characteristics, and/or content, wherein a third profile having one or more notable similarities with the first entity is detected;

identify, for individual ones of the detected profiles having one or more notable similarities with the entities, corresponding collections of profiles that are associated with the entities with which the detected profiles have one or more notable similarities, such that the first collection of profiles corresponding with the first entity is identified;

obtain profile information for the detected profiles and the individual profiles of the corresponding collections of profiles, wherein the profile information is obtained from the third-party platforms, wherein the profile information for individual profiles includes information presented within the individual profiles within the third-party platforms and profile activity of the individual profiles, such that first profile information for the first profile, second profile information for the second profile, and third profile information for the third profile is obtained from the third-party platforms;

compare profile information for the detected profiles with profile information for the individual profiles of the corresponding collections of profiles, wherein aspects of profile information for the detected profiles are compared with similar aspects of profile information for the individual profiles of the corresponding collections of profiles, such that individual aspects of the first profile information and second profile information are compared with similar individual aspects of the third profile information;

determine, based on the comparison, sets of values of veracity parameters for the detected profiles, wherein individual veracity parameters characterize consistency between individual aspects of profile information for the detected profile and profile information for the individual profiles of the corresponding collections of profiles, wherein the sets of values of veracity parameters indicate a likelihood of the detected profiles being associated with the individual entities associated with the individual profiles of the corresponding collection of profiles, such that a third set of values of veracity parameters for the third profile is determined;

determine, based on the sets of values of veracity parameters, whether the detected profiles are associated with the individual entities, such that a first determination is made of the third profile being associated with the first entity based on the third set of values of veracity parameters;

responsive to the determination of the detected profiles being associated with the individual entities, update the veracity information for the individual entities to include the sets of veracity parameters and the detected profiles, wherein updating the veracity information includes modifying the collections of profiles associated with the individual entities to include the detected profiles, such that veracity information for the first entity is updated to include the third set of values of veracity parameters responsive to the first determination, updating the first veracity information including modifying the first collection of profiles to include the third profile;

responsive to the determination of the detected profiles not being associated with the individual entities:

generate indications for the individual entities associated with the individual profiles of the corresponding collections of profiles; and transmit the indications to the individual entities.

2. The system of claim 1, wherein aspects of profile information include profile name, username, profile picture, profile biography, following-to-follower ratio, number of friends, profile account activity, third-party verification, profile account age, and/or associations with one or more other profiles.

3. The system of claim 1, wherein the one or more physical processors are further configured by machine readable instructions to:

generate veracity scores for the detected profiles based on the sets of values of veracity parameters, wherein the veracity score indicates a level of consistency with the individual profiles of the corresponding collections of profiles, such that a first veracity score for the third profile is generated based on the third set of veracity parameters.

4. The system of claim 3, wherein the one or more physical processors are further configured to:

determine whether the veracity scores for the detected profiles meet veracity criteria, wherein meeting veracity criteria indicates the detected profiles are associated with the individual entities; and responsive to the determination of the veracity scores meeting veracity criteria, update the veracity information for the individual entities to include the sets of veracity parameters and the detected profiles.

5. The system of claim 1, wherein monitoring the third-party platforms includes transmitting, in an ongoing manner and at predetermined intervals of time, requests for profile information to the third-party platforms and receiving, responsive to the requests, the user information from the third-party platforms.

6. The system of claim 5, wherein monitoring the third-party platforms further includes analyzing the received user information to identify (i) newly created profiles and (ii) individual entities with which the newly created profiles have one or more notable similarities, wherein the newly created profiles include profiles created within the most recent interval of time.

7. The system of claim 1, wherein transmitting the indications to the individual entities includes providing a notification to the individual entities via client computing platforms associated with the individual entities.

8. The system of claim 1, wherein transmitting the indications to the individual entities includes effectuating presentation of a user interface, wherein the user interface displays user interface elements corresponding to the individual profiles, wherein the indications include icons, badges, and/or flags displayed within the user interface elements corresponding to the individual profiles.

9. The system of claim 1, wherein the first profile is within a first third-party platform and the second profile is within a second third-party platform.

10. The system of claim 1, wherein the indications for the individual users provide instructions to report the detected profiles within the third-party platforms in which the detected profiles are hosted.

11. A method for monitoring veracity of profiles of third-party, online platforms, the method comprising:

storing veracity information that pertains to profiles within third-party platforms and entities associated with the profiles, wherein the profiles are associated with the entities in a many to one manner such that collections of profiles correspond to different ones of the entities, the profiles including a first collection of profiles that correspond to a first entity, the first collection of profiles including a first profile and a second profile, wherein the veracity information includes values of veracity parameters that characterize likelihood of the individual profiles being associated with the individual entities such that the veracity information includes a first set of parameter values for the veracity parameters that characterize likelihood of the first profile being associated with the first entity, and a second set of parameter values for the veracity parameters that characterize likelihood of the second profile being associated with the first entity;

monitoring the third-party platforms to detect profiles created within the third-party platforms having one or more notable similarities with the entities, wherein notable similarities include resemblances in attributes, characteristics, and/or content, wherein a third profile having one or more notable similarities with the first entity is detected;

identifying, for individual ones of the detected profiles having one or more notable similarities with the entities, corresponding collections of profiles that are associated with the entities with which the detected profiles have one or more notable similarities, such that the first collection of profiles corresponding with the first entity is identified;

obtaining profile information for the detected profiles and the individual profiles of the corresponding collections of profiles, wherein the profile information is obtained from the third-party platforms, wherein the profile information for individual profiles includes information presented within the individual profiles within the third-party platforms and profile activity of the individual profiles, such that first profile information for the first profile, second profile information for the second profile, and third profile information for the third profile is obtained from the third-party platforms;

comparing profile information for the detected profiles with profile information for the individual profiles of the corresponding collections of profiles, wherein aspects of profile information for the detected profiles are compared with similar aspects of profile information for the individual profiles of the corresponding collections of profiles, such that individual aspects of the first profile information and second profile information are compared with similar individual aspects of the third profile information;

determining, based on the comparison, sets of values of veracity parameters for the detected profiles, wherein individual veracity parameters characterize consistency between individual aspects of profile information for the detected profile and profile information for the individual profiles of the corresponding collections of profiles, wherein the sets of values of veracity parameters indicate a likelihood of the detected profiles being associated with the individual entities associated with the individual profiles of the corresponding collection of profiles, such that a third set of values of veracity parameters for the third profile is determined;

determining, based on the sets of values of veracity parameters, whether the detected profiles are associated with the individual entities, such that a first determination is made of the third profile being associated with the first entity based on the third set of values of veracity parameters;

responsive to the determination of the detected profiles being associated with the individual entities, updating the veracity information for the individual entities to include the sets of veracity parameters and the detected profiles, wherein updating the veracity information includes modifying the collections of profiles associated with the individual entities to include the detected profiles, such that veracity information for the first entity is updated to include the third set of values of veracity parameters responsive to the first determination, updating the first veracity information including modifying the first collection of profiles to include the third profile;

responsive to the determination of the detected profiles not being associated with the individual entities:

generating indications for the individual entities associated with the individual profiles of the corresponding collections of profiles; and transmitting the indications to the individual entities.

12. The method of claim 11, wherein aspects of profile information include profile name, username, profile picture, profile biography, following-to-follower ratio, number of friends, profile account activity, third-party verification, profile account age, and/or associations with one or more other profiles.

13. The method of claim 11, wherein the method further comprises:

generating veracity scores for the detected profiles based on the sets of values of veracity parameters, wherein the veracity score indicates a level of consistency with the individual profiles of the corresponding collections of profiles, such that a first veracity score for the third profile is generated based on the third set of veracity parameters.

14. The method of claim 13, wherein the method further comprises:

determining whether the veracity scores for the detected profiles meet veracity criteria, wherein meeting veracity criteria indicates the detected profiles are associated with the individual entities; and responsive to the determination of the veracity scores meeting veracity criteria, updating the veracity information for the individual entities to include the sets of veracity parameters and the detected profiles.

15. The method of claim 11, wherein monitoring the third-party platforms includes transmitting, in an ongoing manner and at predetermined intervals of time, requests for profile information to the third-party platforms and receiving, responsive to the requests, the user information from the third-party platforms.

16. The method of claim 15, wherein monitoring the third-party platforms further includes analyzing the received user information to identify (i) newly created profiles and (ii) individual entities with which the newly created profiles have one or more notable similarities, wherein the newly created profiles include profiles created within the most recent interval of time.

17. The method of claim 11, wherein transmitting the indications to the individual entities includes providing a notification to the individual entities via client computing platforms associated with the individual entities.

18. The method of claim 11, wherein transmitting the indications to the individual entities includes effectuating presentation of a user interface, wherein the user interface displays user interface elements corresponding to the individual profiles, wherein the indications include icons, badges, and/or flags displayed within the user interface elements corresponding to the individual profiles.

19. The method of claim 11, wherein the first profile is within a first third-party platform and the second profile is within a second third-party platform.

20. The method of claim 11, wherein the indications for the individual users provide instructions to report the detected profiles within the third-party platforms in which the detected profiles are hosted.

* * * * *